United States Patent
Bielicke

(10) Patent No.: US 11,295,600 B2
(45) Date of Patent: Apr. 5, 2022

(54) EMERGENCY PET LOCATOR AND METHOD

(71) Applicant: Joseph Bielicke, Wildwood, MO (US)

(72) Inventor: Joseph Bielicke, Wildwood, MO (US)

( * ) Notice: Subject to any disclaimer, the term of this patent is extended or adjusted under 35 U.S.C. 154(b) by 0 days.

(21) Appl. No.: 16/793,555

(22) Filed: Feb. 18, 2020

(65) Prior Publication Data

US 2020/0273319 A1 Aug. 27, 2020

Related U.S. Application Data

(60) Provisional application No. 62/809,739, filed on Feb. 25, 2019.

(51) Int. Cl.
*G08B 25/01* (2006.01)
*G08B 27/00* (2006.01)
*G08B 25/10* (2006.01)

(52) U.S. Cl.
CPC .......... *G08B 25/016* (2013.01); *G08B 25/10* (2013.01); *G08B 27/001* (2013.01)

(58) Field of Classification Search
CPC ...... B42D 25/00; B42D 25/28; B42D 25/305; G08B 1/08; G08B 25/10; G08B 25/016; G08B 27/001; G16H 10/65; H04M 11/04; H04W 4/90; H04W 4/33; H04W 4/029; G06Q 20/32
See application file for complete search history.

(56) References Cited

U.S. PATENT DOCUMENTS

| | | | | |
|---|---|---|---|---|
| 7,140,889 B1 * | 11/2006 | Shah | .................. | H01R 13/6397 439/133 |
| 7,196,614 B2 * | 3/2007 | Carolan | ................ | G08B 5/002 340/332 |
| 2004/0251679 A1 * | 12/2004 | Brignull | ............... | B42D 25/305 283/74 |
| 2006/0038691 A1 * | 2/2006 | Bard | ...................... | G08B 7/064 340/628 |
| 2006/0131869 A1 * | 6/2006 | Brignull | ................. | B42D 25/28 283/74 |
| 2008/0040157 A1 * | 2/2008 | Saunders | ............... | G16H 10/60 705/3 |
| 2012/0067944 A1 * | 3/2012 | Ross | .................... | G06K 7/1095 235/375 |

(Continued)

FOREIGN PATENT DOCUMENTS

WO WO-2005077077 A2 * 8/2005 ......... G08B 21/0294

*Primary Examiner* — Matthew C Sams
(74) *Attorney, Agent, or Firm* — Brennan, Manna & Diamond, LLC

(57) ABSTRACT

A system and method of locating a trapped being, such as a pet, in the event of an emergency such as a fire. The system comprises an electronic device having a non-transitory, computer-readable medium comprising software instructions, that when executed by a processor allows a retrieval device to access user input related to a pet's characteristics and location within a structure stored within a memory of the electronic device. The system may further comprise a server connected to the electronic device via a network. A method of locating a pet during an emergency uses the retrieval device to access the user input related to the pet's characteristics and location within the structure stored on the electronic device which is located outside of the structure.

5 Claims, 4 Drawing Sheets

(56) References Cited

U.S. PATENT DOCUMENTS

| | | | |
|---|---|---|---|
| 2012/0217294 A1* | 8/2012 | Souders | G06F 16/9554 235/375 |
| 2013/0057401 A1* | 3/2013 | Rates | G08B 1/08 340/539.1 |
| 2013/0290013 A1* | 10/2013 | Forrester | G16H 10/65 705/2 |
| 2015/0350848 A1* | 12/2015 | Eramian | H04W 4/021 455/404.2 |
| 2016/0205554 A1* | 7/2016 | Cagle | H04L 63/105 455/411 |

* cited by examiner

EMERGENCY PET LOCATOR AND METHOD

CROSS-REFERENCE

This application claims priority from Provisional Patent Application Ser. No. 62/809,739 filed on Feb. 25, 2019.

BACKGROUND

Many animals end up trapped within a home during a fire or other emergency without a way to alert rescue personnel of their presence or location. Some of these animals are not only trapped inside but may be locked in a crate or pen with no chance of escape. In the event of a fire, people frequently risk their lives to not only save family members, but their pets as well. Pets are often considered as a part of the family. Countless individuals are injured or killed during these self-rescue attempts. Even trained firefighters are commonly injured while attempting these rescues.

Fires today spread much more quickly than even a few years ago. Research has shown that while individuals may have had up to 15 minutes to escape the average house fire about 30 years ago, the typical escape time today is less than four minutes on average from the onset of the fire. Fires are usually not discovered for at least a minute or more, further decreasing the time to respond and escape. Modern materials are extremely combustible due the increased use of synthetic and plastic materials. In less than 30 seconds, a small fire can become a major fire creating thick black toxic smoke. The smoke today is also more dangerous as it is filled with carbon monoxide, hydrogen cyanide, and other fire gasses that quickly overwhelm and kill people after just a couple of breaths.

Additionally, modern building construction contributes to quicker fire spread. Solid wood construction has been replaced by open trusses, smaller structural framing members, particle board, and manufactured I-joists that quickly fail when exposed to fire. Garages are often attached to the main house further increasing the fuel load with gasoline and other combustibles. Firefighting tactics have even changed due to the newer materials and construction. Firefighters are now trained to initially attack fires from the outside due to the dangers when there are no known lives at risk. While firefighters are trained to "risk a lot to save a lot" (i.e. attempt rescues for a known life safety situation), they are much more cautious when there is not an obvious person or pet to rescue due to the extreme dangers.

When determining whether to attempt a rescue, seconds matter. Firefighters are trained to search living areas and bedrooms first when the location of a victim is unknown. Today, disabled or elderly people are often located in makeshift rooms in basements, or areas that were not originally designed for obvious occupancy. Additionally, pets may be housed in garages or basements that are not initially obvious to rescuers. Rescue personnel have multiple tasks during a fire. There is often not enough manpower to effectively search an entire house while simultaneously performing other firefighting tactics. Any information as to location of a potential victim is extremely valuable to rescuers as it saves precious time by not having to search the entire structure. The quicker rescuers can locate a victim or a pet, the greater the likelihood of survival.

Traditionally, rescuers will interview occupants or neighbors to try to get information on potential victims and their potential locations inside the house prior to a rescue attempt. Unfortunately, there is often limited, or even wrong information conveyed because the occupants may be trapped, not at home, or are confused and agitated during the emergency. While fire departments use pre-plans for commercial structures to show the interior of a building, they do not have them for most residential occupancies. Previously, homeowners could place stickers on a window to alert rescuers to a child or pet' possible location. Unfortunately, the stickers were left in place long after the family circumstances change, such as when a child or pet no longer lives there. As these static warning devices are not updatable, firefighters have been trained to ignore them.

Accordingly, there is a great need for a way for rescuers to know if there is a potential life to save in the event of a fire. Additionally, there is a need to know the likely location of these lives. The present invention discloses a system designed to alert emergency personnel that a pet is inside the home in the event of a fire or other emergency. Advantageously, the system can offer pertinent up-to-date information regarding the trapped animal and its possible location within the home. The system provides a way for rescuers to access the information outside of the house before attempting a rescue. Rescue personnel can access the information from a safe area before entering the structure. The system may also be easily used by individuals with physical or mental limitations.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an electronic device comprising a housing and a non-transitory computer-readable medium comprising software instructions. The software instructions comprise a programable component configured to receive and store user input related to a living being's characteristics. The programable component is further configured to receive and store user input indicating a living being's location.

The living being's characteristics may comprise a pet type, a breed, a size, an image, or a name. The living being's location is typically a location within a structure, such as a house or apartment. The software instructions further comprise an information retrieval component to provide feedback on the living being's characteristics and location when accessed. The information retrieval component is accessible via a retrieval device. The electronic device is weather resistant and designed to be located outside of the structure so as to be easily accessible by rescuers in the event of an emergency.

An additional embodiment of the present invention comprises a system for locating a living being in an emergency. The system comprises an electronic device comprising a housing and a non-transitory computer-readable medium comprising software instructions. The software instructions comprise a programable component configured to receive and store user input related to the living being. The user input comprises the living being's characteristics and the living being's location within the structure. The software instructions further comprise an information retrieval component to provide feedback on the living being's characteristics and location when accessed.

The system further comprises a server in electronic communication with the electronic device via a network. The server comprises a server processor and a server memory comprising a set of executable instructions comprising an information storage component. The information storage component may receive and store the user input related to the living being's characteristics and location from the electronic device.

The system further comprises a retrieval device. The retrieval device comprises a scanning component, a processor, and an information accessing component. The retrieval device is configured to interact with the electronic device directly or indirectly with the server via the network to upload the user input related to the living being's characteristics and location that is stored on either the electronic device, the server, or both.

An additional embodiment of the present invention comprises a method of locating a pet during an emergency. The method comprises uploading a plurality of pet characteristics to an electronic device. The electronic device comprises a housing and a non-transitory computer-readable medium comprising software instructions. The electronic device further comprises a programable component configured to receive and store user input related to a plurality of pet characteristics including a pet type, a breed, a size, an image, or a name. The plurality of pet characteristics may further comprise a pet location within a structure. The electronic device further comprises an information retrieval component to provide feedback on the pet's characteristics and location when accessed.

The method further comprises locating the electronic device outside of a structure. The method further comprises accessing the plurality of pet characteristics via a retrieval device. The retrieval device comprises a scanning component, a processor, and an information accessing component. The retrieval device is configured to interact with the electronic device directly or indirectly with a server via a network to upload the user input related to the living pet's characteristics and location that is stored on either the electronic device, the server, or both.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

Figure 1:
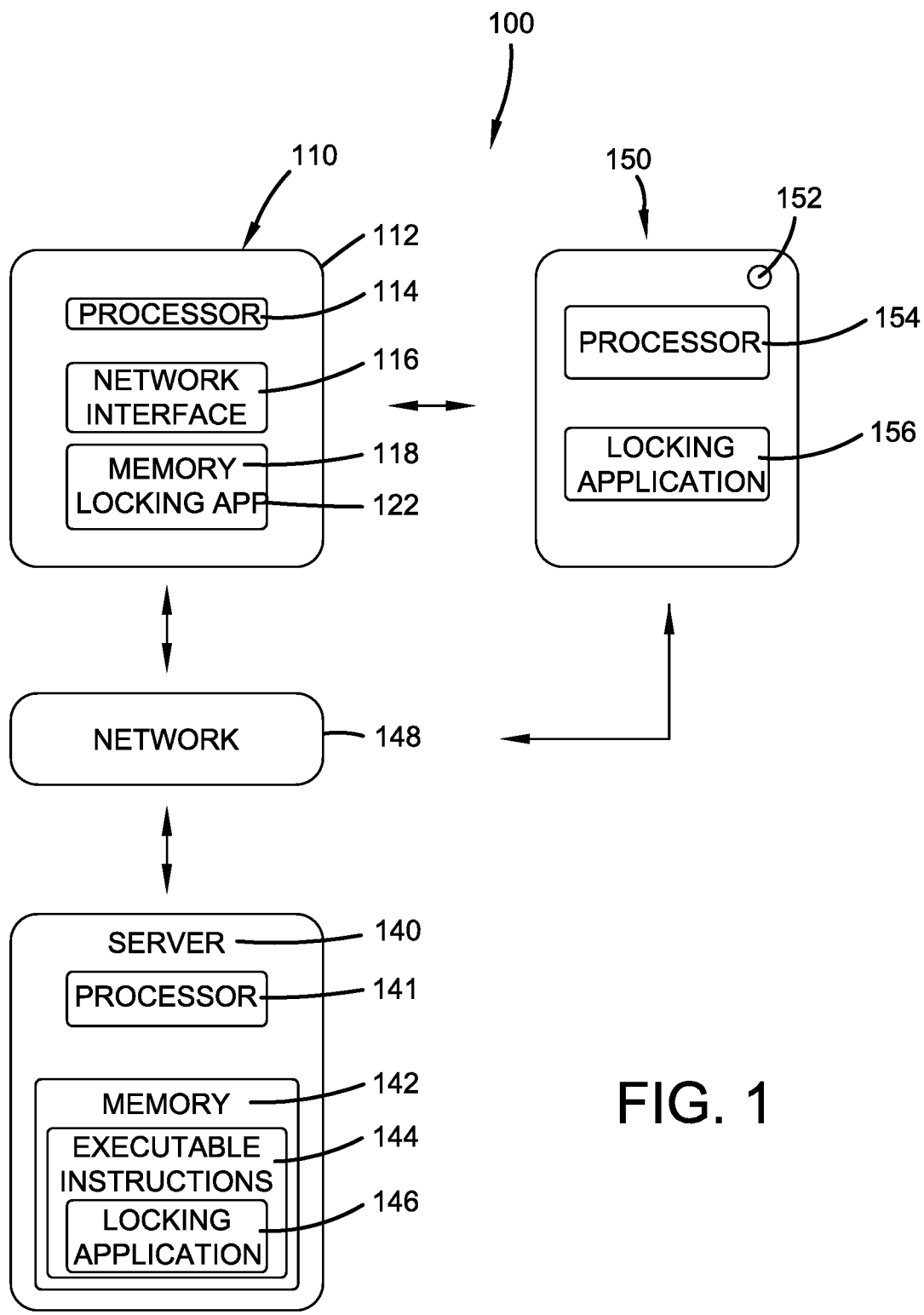
FIG. 1 illustrates a schematic diagram of a computer environment for practicing aspects of the present technology in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a unique small electronic device that may be mounted or otherwise attached to a mailbox, a doorknob, or other area outside of a home. The invention further discloses a system and method that allows firefighters or other first responders to quickly scan or access the electronic device to retrieve information needed to assist in rescuing a person, pet, or other domestic creature. The electronic device can be synced with a phone, tablet, computer, or other electronic device to allow a homeowner, occupant, or pet owner to program the electronic device with information regarding their pet that can be easily accessed by rescuers in the event of a fire or other emergency.

The invention includes a device that can be pre-programmed by users with pertinent information, such as the animal's breed, type, size, name, an image, and a location of the cage or habitat within the home. The device is weather resistant and may be attached to or located in a safe place outside of the home. Rescue personnel may scan or access the device upon arrival to safely access the information. The device may be programmed and accessed using a corresponding mobile App. The device may be also programmed with information regarding a human, such as an infant or physically disabled individual that could not otherwise self-rescue.

Referring initially to FIG. 1, an electronic device 110 for storing emergency information comprises a housing 112. The housing 112 is constructed from plastic or metal and is configured to be weather resistant and watertight. The housing 112 is attachable to an exterior portion of a structure such as a house or apartment. For example, the housing 112 may have a locking mechanism, strap, or mechanical attachment or bracket for attaching the electronic device 110 to a mailbox, a doorknob, or a mounting position on an exterior wall or column. For example, magnetic or adhesive strips could be applied to the housing 112 for attaching the electronic device 110 to the structure.

The electronic device 110 is equipped with a processor 114, a network interface 116, and a memory 118. The processor 112 is configured to execute instructions that are stored in the memory 118. The memory 118 comprises a non-transitory computer-readable medium comprising a set of software instructions 122 that stores an emergency pet locating application, typically in the form of an App. The set of software instructions 122 allows the electronic device 110 to perform methods of the present technology when executed by the at least one processor 112.

Figure 2:
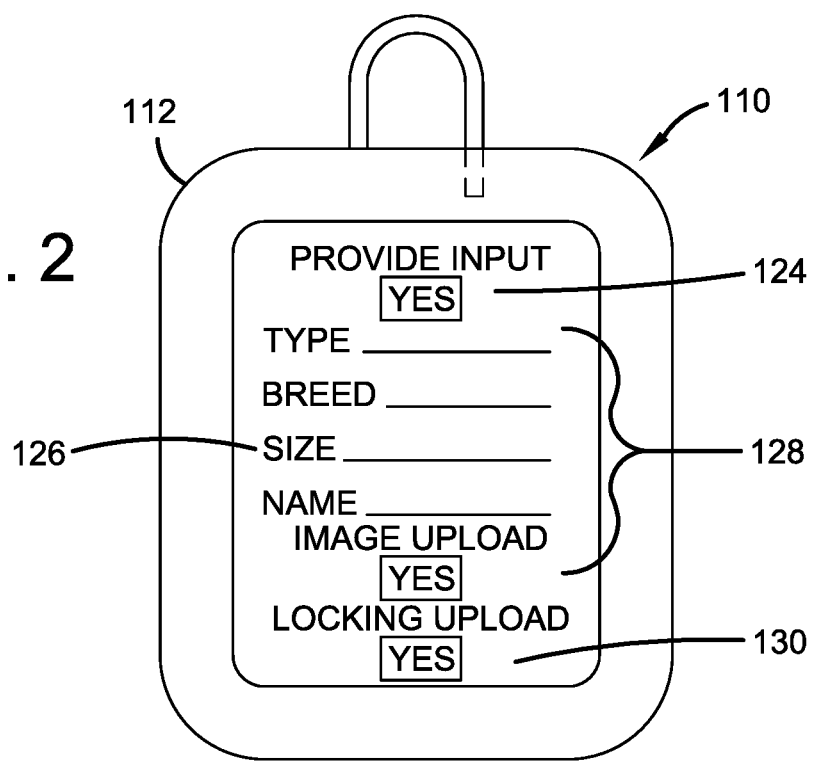
FIG. 2 illustrates an electronic device displaying a programable component for uploading user input related to a plurality of living being characteristics in accordance with the disclosed architecture.
Figure 3:
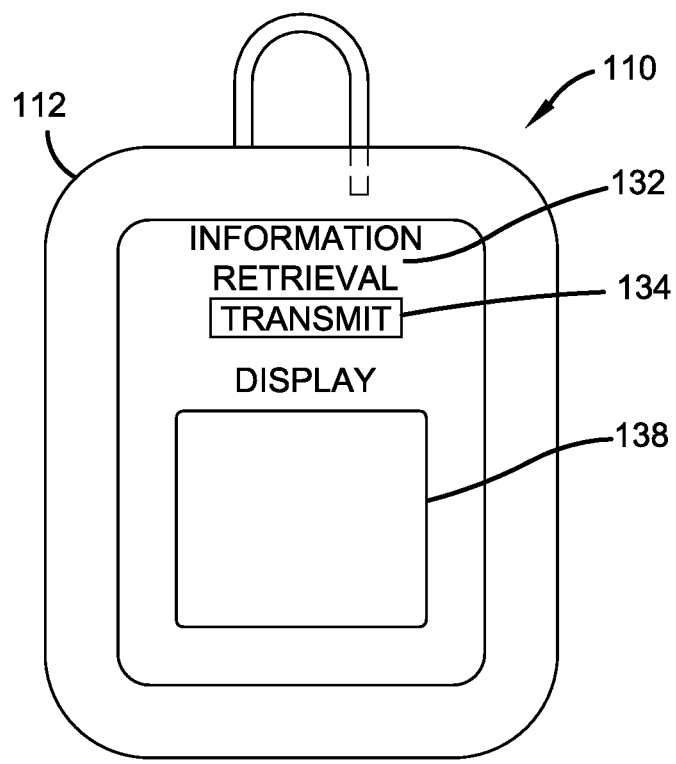
FIG. 3 illustrates the electronic device displaying an information retrieval component in accordance with the disclosed architecture.

As illustrated in FIGS. 2 and 3, the set of software instructions 122 store a programmable component 124 and an information retrieval component 132. The programmable component 124 is configured to receive a plurality of user input 126 related to a living being's characteristics 128. The living being's characteristics 128 may comprise a pet type, a breed, a size, an image of living being, a name, or any other information that may be relevant to rescuers in the event of an emergency. The image of the living being may be an electronically uploadable image of the living being, such as a picture. The living being may be a pet, a domestic animal, or a human being. For example, a child or physically disabled individual. In this instance, special instructions or information concerning the person or disability (i.e. hearing impaired) could be programmed.

Figure 4:
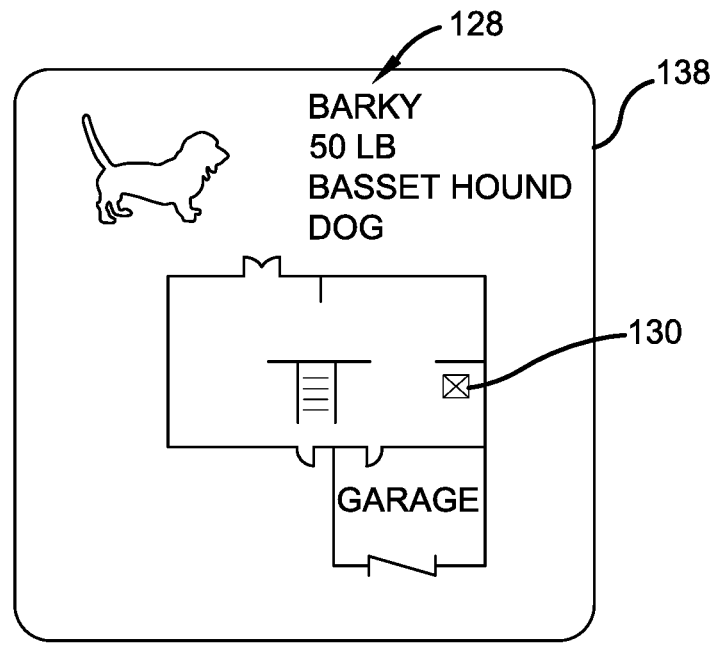
FIG. 4 illustrates the electronic device displaying a plurality of user input in accordance with the disclosed architecture.

As illustrated in FIG. 4, the programmable component 124 is further configured to receive a plurality of user input related 126 to a living being's location 130 within the structure. For example, the pet may be locked in a cage located in a basement, a storage room, or any location within the structure. The user input 126 of the living being's location 130 may be displayed as a map of the structure, or a set of instructions describing the specific location inside, or both.

Figure 5:
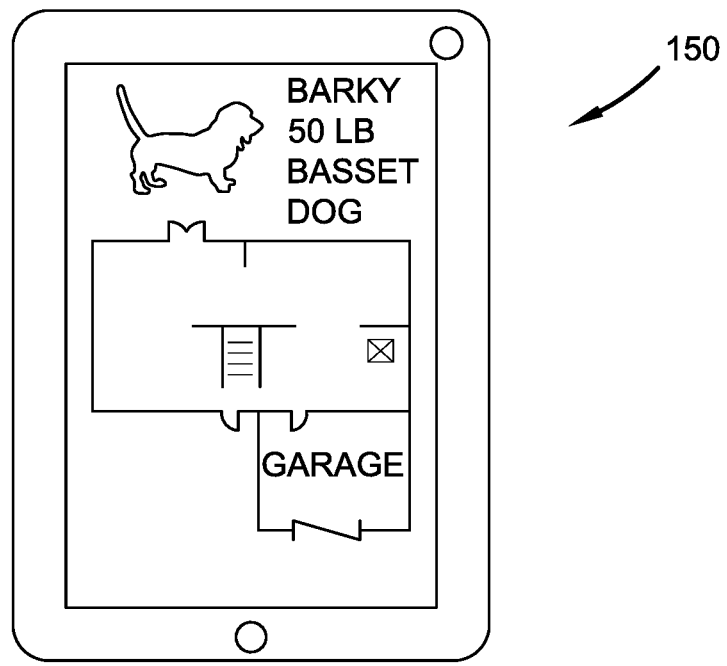
FIG. 5 illustrates a retrieval device displaying the plurality of user input retrieved from the electronic device in accordance with the disclosed architecture.

As illustrated in FIGS. 1 and 5, the information retrieval component 132 is configured to provide feedback when accessed. The information retrieval component 132 is accessible via a retrieval device 150 as discussed infra. Returning to FIG. 3, the information retrieval component 132 may comprise a transmitting element 134, a visual indicator 138, or both. The transmitting element 134 may be an electronic button, a transmitter, or a RFID chip/antenna configuration that is accessible via the retrieval device 150. The visual indicator 138 may be a display screen on the electronic device 110 that allows the accessor to pull up the plurality of user input 126 directly on the electronic device 110 itself without the need to use the retrieval device 150. Additionally, the electronic device 110 may further comprise a battery life indicator (not shown), such as a LED indicator.

The electronic device 110 is configured to assist rescuers in the event of an emergency such as a fire, a carbon monoxide emergency, a medical emergency, a natural disaster, or any other type of emergency where the stored plurality of user input 126 would be useful to responders. For example, firefighters could easily access the information in the event of a fire requiring rescue. Similarly, emergency medical technicians or police officers could be alerted to the presence of an animal that may want to protect the pet owner in the event of a medical emergency and take appropriate precautions to protect themselves, the pet owner, and the pet.

In an additional embodiment of the present invention, a system 100 for locating a living being during an emergency comprises an electronic device 110, a server 140, and a retrieval device 150 as illustrated in FIG. 1. The electronic device 110 comprises a housing 112. The housing 112 is constructed from plastic or metal and is configured to be weather resistant and waterproof. The housing 112 is attachable to an exterior portion of a structure such as a house or apartment. For example, the housing 112 may have a locking mechanism, strap, of mechanical attachment for attaching the electronic device 110 to a mailbox, a doorknob, or a mounting position on an exterior wall or column.

The electronic device 110 is equipped with a processor 114, a network interface 116, and a memory 118. The processor 112 is configured to execute instructions that are stored in the memory 118. The memory 118 comprises a non-transitory computer-readable medium comprising a set of software instructions 122 that stores an emergency pet locating application, typically in the form of an App.

As illustrated in FIGS. 2 and 3, the set of software instructions 122 store a programmable component 124 and an information retrieval component 132. The programmable component 124 is configured to receive user input 126 related to a living being. The user input 126 comprises the living being's characteristics 128. The living being's characteristics 128 may comprise a pet type, a breed, a size, an image of living being, a name, or any other information that may be relevant to rescuers in the event of an emergency. The image of the living being may be an electronically uploadable image of the living being, such as a picture. The living being may be a pet, a domestic animal, or a human being. The user input 126 further comprises a living being's location 130 within the structure. The living being's location 130 may be a map of the structure, or a set of instructions describing the specific location inside.

As illustrated in FIGS. 1 and 5, the information retrieval component 132 is configured to provide feedback when accessed. The information retrieval component 132 is accessible via the retrieval device 150. Returning to FIG. 3, the information retrieval component 132 may comprise a transmitting element 134 and a visual indicator 138. The transmitting element 134 may be an electronic button, a transmitter, or a RFID chip/antenna configuration that is accessible via the retrieval device 150. The visual indicator 138 may be a display screen on the electronic device 110 that allows the accessor to pull up the plurality of user input 126 directly on the electronic device 110 itself without the need to use the retrieval device 150.

Returning to FIG. 1, the server 140 comprises a server processor 141 and a server memory 142. The server 140 is in electronic communication with the electronic device 110 via a network 148. The server memory 142 comprises a set of executable software instructions 144 storing an information storage component 146. The network 148 connects the electronic device 110 to the server 140. The network 148 may be any of a number of private or public communications mechanisms such as the Internet, a local intranet, a Personal Area Network, a Local Area Network, a Wide Area Network, a Virtual Private Network, or the like. When electronic device 110 is connected to the server 140 via the network 148, the set of executable software instructions 144 allows the server 140 to perform methods of the present technology when executed by the server processor 141.

The retrieval device 150 comprises a scanning component 152 and a retrieval device processor 154. The retrieval device 150 is a user interface such as, but not limited to, a mobile phone, a smart phone, a tablet, an iPad, a barcode scanner, a RFID reader, or the like. The retrieval device 150 further comprises an information accessing component 156, typically in the form of an App. The retrieval device 150 is configured to directly interact with the electronic device 110 via scanning or downloading the stored plurality of user input 126 from the electronic device 110. Alternatively, the retrieval device 150 may be additionally configured to directly interact with the server 140 via the App. This would be advantageous as responders could access the stored plurality of user input 126 prior to arrival at the location of the electronic device 100 saving additional time.

Figure 6:
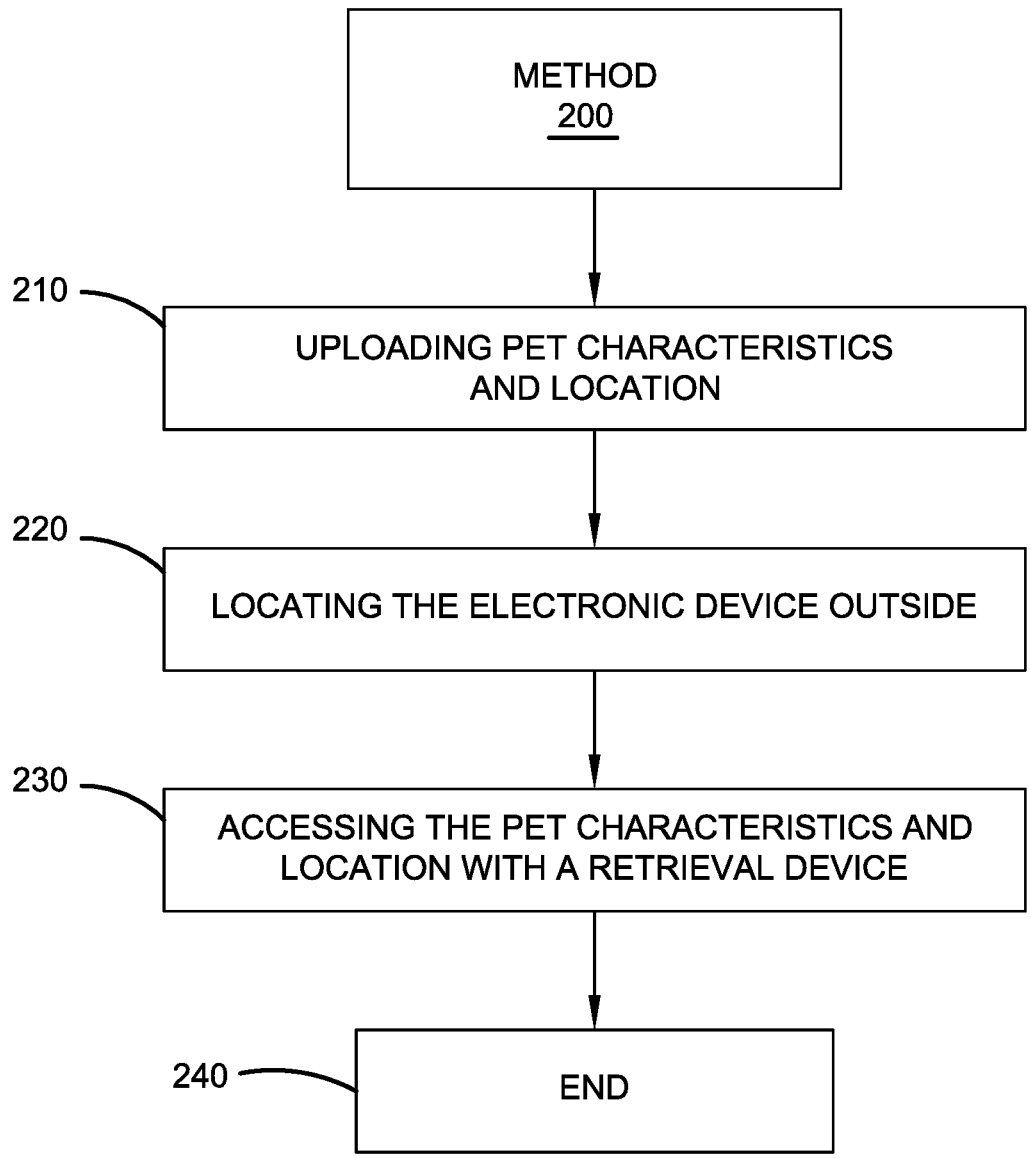
FIG. 6 illustrates a flowchart of a method for locating a pet during an emergency in accordance with the disclosed architecture.

FIG. 6 is a flowchart of an exemplary method of locating a pet during an emergency using the system 100 of the electronic device 110, the server 140, or the retrieval device 150. The method 200 comprises uploading the plurality of pet characteristics 126 to the electronic device 110 at 210. The plurality of pet characteristics 126 may comprise the pet type, a breed, a size, an image of living being, a name, or any other information that may be relevant to rescuers in the event of an emergency. The plurality of pet characteristics 126 may further comprise the location 130 of the pet within a structure.

Next, at 220, the electronic device 110 is located outside of the structure. As such, the electronic device 110 is weather resistant and waterproof. The electronic device 110 is attachable to an exterior portion of a structure such as a house or apartment. At 230, the retrieval device 150 is used to access the plurality of pet characteristics 126. The retrieval device 150 comprises the scanning component 152 to access the information. As before, the retrieval device 150 is configured to directly interact with the electronic device 110 via scanning or downloading the plurality of pet characteristics 126 directly from the electronic device 110. Alternatively, the retrieval device 150 may be additionally configured to directly interact with the server 140 via the App. The method then ends at 240 once the information has been accessed by the emergency responders.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for locating a living being in a structure during an emergency, the system comprising:

an electronic device having a non-transitory, computer-readable medium comprising software instructions, the software instructions comprising:
  a programmable component configured to receive user input related to the living being and an uploaded image of the living being;
  an information retrieval component comprising a transmitting element; and
  a visual indicator comprising a display screen configured to display the user input when accessed and a battery life indicator;
a server in electronic communication with the electronic device via a network, the server comprising a set of executable software instructions configured to receive and remotely store the user input related to the living being in an information storage component; and
a retrieval device comprising a scanning component for directly accessing the user input from the information retrieval component and an information accessing component for remotely accessing the user input from the information storage component via the network without directly accessing the electronic device; and
wherein the user input related to the living being is accessible by a first responder utilizing the retrieval device prior to arrival at the structure via the information accessing component.

2. The system of claim 1, wherein the user input comprises the living being's characteristics.

3. The system of claim 2, wherein the living being's characteristics comprise a pet type, a breed, a size, or a name.

4. The system of claim 1, wherein the user input comprises the living being's location within a structure.

5. The system of claim 1, wherein the electronic device is weather resistant.

* * * * *